US006594227B1

(12) United States Patent
Ogawa et al.

(10) Patent No.: US 6,594,227 B1
(45) Date of Patent: Jul. 15, 2003

(54) COMMUNICATION CONTROL SYSTEM

(75) Inventors: Toshi Ogawa, Tokyo (JP); Chuuji Akiyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/381,450

(22) PCT Filed: Jan. 11, 1999

(86) PCT No.: PCT/JP99/00056

§ 371 (c)(1),
(2), (4) Date: Sep. 20, 1999

(87) PCT Pub. No.: WO99/37060

PCT Pub. Date: Jul. 22, 1999

(30) Foreign Application Priority Data

Jan. 13, 1998 (JP) .......................................... 10-004956

(51) Int. Cl.[7] .................. G01R 31/08; G06F 11/00; H04J 1/16; H04J 3/14; H04L 1/00
(52) U.S. Cl. ..................... 370/216; 370/218; 370/401
(58) Field of Search ................................ 370/401, 352, 370/353, 354, 355, 356, 216, 217, 218, 225, 228; 714/4

(56) References Cited

U.S. PATENT DOCUMENTS

| 4,701,908 A | * | 10/1987 | Ikeda ........................ 370/451 |
|---|---|---|---|
| 5,280,476 A | * | 1/1994 | Kojima et al. ............... 370/397 |
| 5,329,528 A | * | 7/1994 | Akai et al. .................. 370/445 |
| 5,375,117 A | * | 12/1994 | Morita et al. ................ 370/420 |
| 5,442,631 A | * | 8/1995 | Tanaka et al. ............... 370/463 |
| 5,526,351 A | * | 6/1996 | Mochinaga et al. ........ 370/399 |
| 6,208,616 B1 | * | 3/2001 | Mahalingam et al. ....... 370/216 |
| 6,253,334 B1 | * | 6/2001 | Amdahl et al. ................. 714/4 |
| 6,314,525 B1 | * | 11/2001 | Mahalingham et al. ........ 714/4 |

* cited by examiner

*Primary Examiner*—Wellington Chin
*Assistant Examiner*—Jamal A. Fox
(74) *Attorney, Agent, or Firm*—Moonray Kojima

(57) ABSTRACT

In order to make it unnecessary for a user application program to be aware of any redundant configuration even if such a configuration is applied when communication stations, which communicate with each other according to the TCP/IP protocols over the Ethernet, a communication control system is provided wherein a redundancy control device converts a receiver MAC address included in a transmission request into an MAC address of a network adapter to communicate with, when the redundancy control device receives a transmission request from a communication control device, and converts a sender MAC address included in a received frame into the MAC address, which the communication control device of the location communication station is aware of, when the redundancy control device receives the frame from a network adapter.

22 Claims, 7 Drawing Sheets

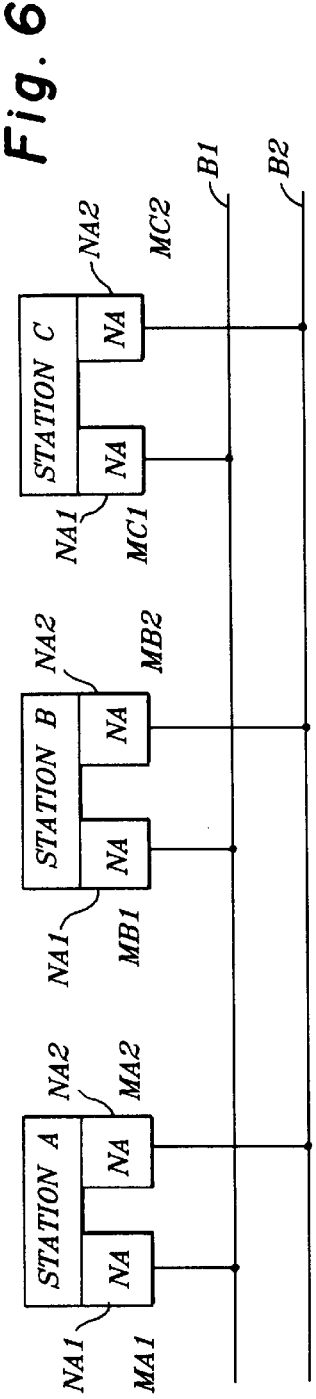

MAC ADD. MAPPING TABLE STATION A

| VIR. MAC ADD | COM. PT. MA1 | COM. PT. MA2 |
|---|---|---|
| MAC-B | MB1 | MB2 |
| MAC-C | MC1 | MC2 |

MAC ADD. MAPPING TABLE STATION B

| VIR. MAC ADD | COM. PT. MB1 | COM. PT. MB2 |
|---|---|---|
| MAC-A | MA1 | MA2 |
| MAC-C | MC1 | MC2 |

COMMUNICATION CONTROL SYSTEM

FIELD OF THE TECHNOLOGY

The present invention relates to a communication control system wherein communication stations which communicate with each other according to TCP/IP protocols are connected to Ethernet buses.

BACKGROUND OF THE TECHNOLOGY

TCP/IP (Transfer Control Protocol/Internet Protocol) is a globally popular protocol for computer networks. It is a combination of two protocols TCP and/or UDP and IP, where TCP is designed to accurately transfer data while IP is designed to transfer data between networks in the form of packets.

Ethernet is a LAN (Local Area Network) most frequently used for computer networks. And "Ethernet" is a registered trademark of Xerox Corporation.

In FIG. 1, reference symbol "B" refers to the bus. In FIG. 2, the structure of the communication frame "TCP MESSAGE" comprises the TCP header (HEADR) and the TCP data; the IP PACKET comprises the IP header (HEADR) and the IP data; and the ETHERNET FRAME comprises the ETHERNET header (HDR), the ETHERNET data, and the ERROR CONTROL. "TCP" means "transfer control protocol". "IP" means "Internet Protocol".

FIG. 1 is a conceptual diagram showing the configuration of a communication control system where a communication station which communicates with other stations according to TCP/IP protocols is connected to an Ethernet (hereinafter referred to as E bus). This diagram conceptually shows how software and hardware are configured in the communication control system.

A communication station ST is connected to an E bus B through network adapter NA.

There are TCP and UDP in the layer above the layer of IP. The communication station ST communicates with other stations according to these protocols.

UDP (User Data Protocol) is used to send a packet of data. Communication between a transmitting communication station and a receiving communication station takes place only once in an attempt to transfer such a packet, and there is no ability for this communication to recover from any communication failure. TCP establishes a connection between the transmitting communication station and the receiving communication station to provide such abilities as recovery from communication failure. Both of these protocols use an IP address and a protocol port number to recognize a mutual communication partner.

There are user application program(s) AP above the layer of TCP and UDP.

FIG. 2 is a schematic representation showing the structure of a communication frame for TCP. Network adapters NA receive only those frames directed at their local communication station in order to reduce the burden of software located just above the layer of the network adapters. For this purpose, a 6-byte receiver's address (referred to as a MAC address) is appended to the Ethernet header shown in FIG. 11. The MAC address is specified so that it is unique to each network adapter and there is no address duplication on a global scale. The unit of data transferred using TCP/IP is called an IP packet, which is encupsulated in the data field of an Ethernet frame. TCP/IP communication is designed so that data can also be transferred using other media, such as ATM (Asynchronous Transfer) or WAN (Wide Area Network). Each IP packet, therefore, has an Internet address. (called an IP address) as the receiver's address.

As described above, if communication stations which communicate with each other according to TCP/IP protocols are connected to an E bus through network adapters, the stations are required to have both a MAC address and at least one IP address. However, IP recognizes only one MAC address for each IP, which it is communication with. This has been a bottleneck when a communication system needs to be made redundant.

Some distributed control systems are provided with an E bus and some of these distributed control systems have a redundant configuration to more than one E buses in order to increase reliability. The fact that IP recognizes only one MAC address for each remote IP is a drawback, however, when a distributed control system needs to be-connected to redundant E buses, as described below.

FIG. 3 shows examples of conventional systems with redundant connections to E buses through TCP/IP protocols. In FIG. 3, diagram (a) is an example where TCP is used and diagram (b) is an example where UDP is used.

Referring to FIG. 3, buses B1 and B2 are installed as E buses. In each of the transmitting and receiving communication stations, the layers ranging from network adapters NA to TCP or UDP are made dual-redundant. It is the responsibility of a user application program AP to determine which of two redundant communication routes to use. Since the IP address is accompanied with only on MAC address, the IF layer, as well as the layer of TCP or UDP just above the IP layer, must also be made dual-redundant. In this communication control system, redundancy control must be done by the user application program AP.

This example of the prior art has the following problems:
[1] Redundancy control must be carried out by the user application program, resulting in an increase in the burden of the program.
[2] Duplication of the TCP layers requires resources (memory) for connection management, for example, to be doubled.
[3] TCP is a protocol for stream-type communication, where flow control mechanism checks if the each part of stream data is securely transferred. As a result, it is relatively difficult to guarantee the complete data transfer without any loss or duplication when TCP connection is switched over.
[4] Communication for the purpose of maintaining TCP connection is essential; therefore, the redundant connections increase the burden of a network traffic.
[5] Duplication of UDP layers eliminate the problem discussed in item 4 above. However, this solution involves a problem that the order of data items becomes unpredictable.
[6] Duplication of UDP layers do not solve the problem that data, if lost, cannot be recovered.
[7] A recovery process is therefore required for the user application program to be able to solve the problem discussed in item 6 above. However, this solution significantly increases the burden of the program.
[8] Standard TCP/IP applications do not assume such redundancy as discussed above; therefore, most TCP/IP applications, except some special ones, cannot benefit from the advantages of redundant configuration.

The present invention is intended to solve the aforementioned problems. The object of the present invention, therefore, is to provide a communication control system which is configured so that only one MAC address, which IP is aware of, is passed to IP even if duplicated components are switched between, thus making it unnecessary for the user application program to be aware of any redundant configuration even if such a configuration is applied when communication stations, which communicate with each other according to TCP/IP protocols, are connected to E buses.

DESCRIPTION OF THE INVENTION

As the means for solving the aforementioned problems, the present invention provides a communication control system configured as described below.

(1) A communication control system, wherein communication stations are connected to a network through network adapters; the communication stations are provided with communication control means; the communication control means communicate with each other according to TCP/IP protocols; a specific MAC address is assigned to each of the network adapters; and the communication control means is aware of only one MAC address for any single remote communication station, having:
  a configuration in which only one unit of the communication control means is incorporated in each communication station and network adapters are incorporated redundantly in each communication station, and comprising:
    a redundancy control means, which exists between the network adapters and the communication control means, and which converts a receiver's MAC address included in a transmission request into the MAC address of one of network adapters to communicate with, when the redundancy control means receives a transmission request from the communication control means; and converts a sender's MAC address included in a received frame into the MAC address, which the communication control means of the local communication station is aware of as its local network adapter, if the redundancy control means receives the frame from one of the network adapters.

(2) A communication control system as defined in item (1), wherein the redundancy control means has an address mapping table, and network adapters serving as the communication partners of the local network adapters are defined therein.

(3) A communication control system as defined in item (1), wherein the MAC addresses of the local network adapters and the MAC addresses of network adapters serving as the communication partners of the local network adapters are written in pairs in the address mapping table.

(4) A communication control system as defined in item (1), wherein the redundancy control means selects either of the redundant network adapters as the regular-use network adapter to carry out communication.

(5) A communication control system as defined in item (4), wherein the redundancy control means periodically switches the regular-use network adapter from the redundant network adapters.

(6) A communication control system as defined in item (4), comprising a diagnostic means for letting the regular-use network adapter send out network-diagnosing frames in a given period.

(7) A communication control system as defined in item (6), wherein the diagnostic means sends ICMP echo messages for a given period as diagnostic-frames and detects failure if the diagnostic means fails to receive a response within the given time period.

(8) A communication control system as defined in item (6), wherein the diagnostic means sends diagnostic frames to all communication stations on the network.

(9) A communication control system as defined in item (6), wherein the diagnostic means sends diagnostic frames only to a communication station that is necessary to secure a communication route.

(10) A communication control system as defined in item (2) or (3), wherein the redundancy control means of a transmitting communication station sends communication frames to all network adapters of the communication partner and the redundancy control means of a receiving communication station selects only the communication frame or frames having the MAC address which the communication control means of the local communication station is aware of, among the multiple communication frames received by the local redundant network adapters, and then passes the communication frame(s) to the communication control means.

(11) A communication control system as defined in item (10), wherein the redundancy control means of a receiving communication station passes the communication frames received by the regular-use network adapter to the local communication control means and uses the communication frames received by the other network adapter (s) as diagnostic frames.

(12) A communication control system as defined in item (10), wherein the redundancy control means of a receiving communication station periodically switches the regular-use network adapter from the redundant network adapters.

(13) A communication.control system as defined in item (11) or (12), wherein if the regular-use network adapter does not receive any communication frames whereas the other network adapter does, the redundancy control means of.a receiving communication station designates the network adapter that receives communication frames as the new regular-use network adapter and the previous regular-use network adapter as the stand-by network adapter.

(14) A communication control system as defined in item (10), wherein the redundancy control means of a receiving communication station passes the communication frames sent by the network adapter, which was the first to receive communication frames, to the local communication control means and uses the communication frames that the redundancy control means receives from the other network adapter as diagnostic frames.

(15) A communication control system as defined in item (1), wherein the communication control means defines virtual MAC addresses as the MAC address which the communication stations is aware of, and the redundancy control means carries out conversion between the real MAC addresses and the virtual MAC addresses.

(16) A communication control system as defined in item (15), wherein the real MAC addresses of a remote communication station, which are defined during system startup, are used as the virtual MAC addresses.

(17) A communication control system as defined in any of items (2) to (16), wherein the redundancy control means updates an address mapping table as the result of successful receipt of communication frames.

(18) A communication control system, wherein communication stations are connected to a network, the communication stations are provided with communication control means, the communication control means communicate with each other according to TCP/IP protocols, and the communication control means is aware of only one MAC address for any single remote communication station, having:

a configuration in which only one unit of the communication control means is incorporated in each communication station, and comprising:

ports redundantly incorporated in each communication station; network controllers which exist between the ports and the communication control means, have MAC addresses, and send or receive communication frames input to or output from the ports; and a port management means which if the regular-use port is changed, connects the network controller having a MAC address that the communication control means is aware of to the new regular-use port.

(19) A communication control system as defined in item (18), wherein the port management means controls the two redundant ports so that the regular-use port carries out regular communication and the other port carries out network diagnosis only.

(20) A communication control system as defined in item (18), comprising a diagnostic means which transmits network-diagnosing frames through a port for a given period.

(21) A communication control system as defined in item (18), wherein the diagnostic means sends ICMP echo messages for a given period as diagnostic frames and detects failure if the diagnostic means fails to receive a response within the given time period.

(22) A communication control system as defined in item (18), wherein the period for which the diagnostic means sends diagnostic frames differs between the regular-use port and the other port.

BRIEF DESCRIPTION OF DRAWINGS

FIG. 6 is a diagram showing the behavior of the present invention.

FIG. 7 is a schematic representation showing the data to explain the present invention.

FIG. 8 is another schematic representation showing the data to explain the behavior of the present invention.

DESCRIPTION OF THE PREFERRED EMBODIMENTS

The present invention is described in detail below using the accompanying drawings.

Figure 1:
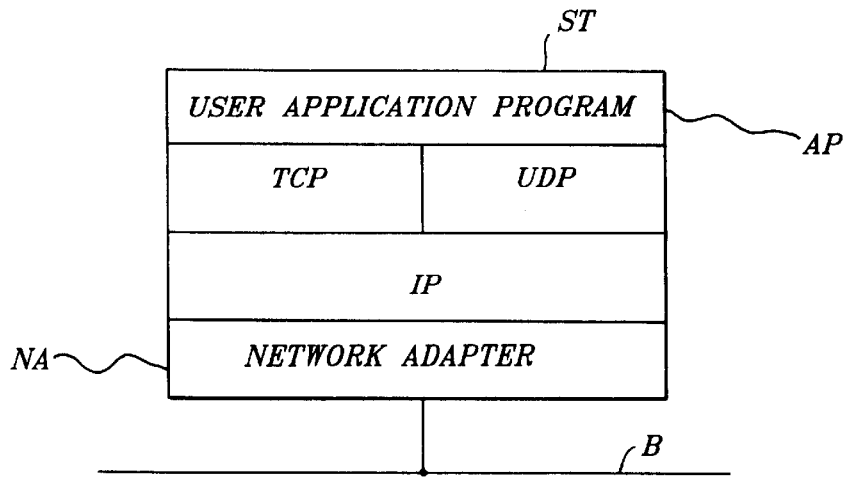
FIG. 1 is a conceptual diagram showing the configuration of Ethernet communication station.
Figure 2:
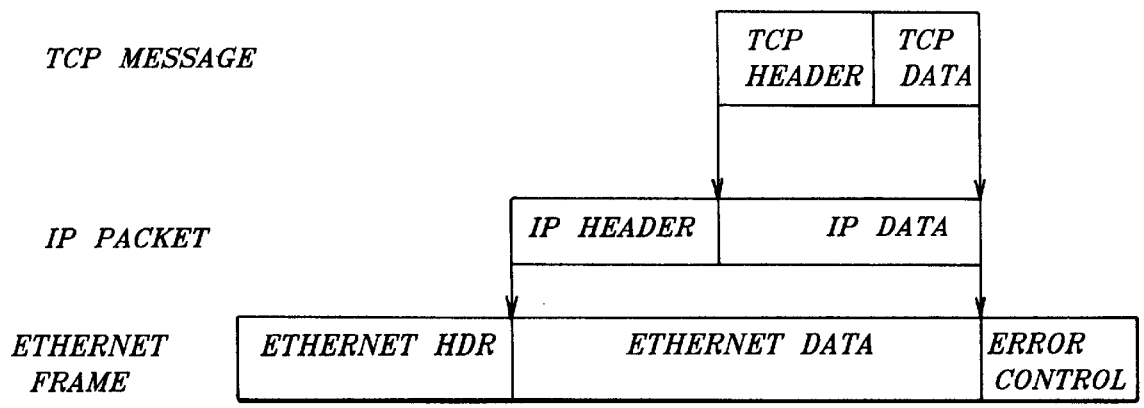
FIG. 2 is a diagrammatic showing the structure of TCP/IP, Ethernet frame.
Figure 3A:
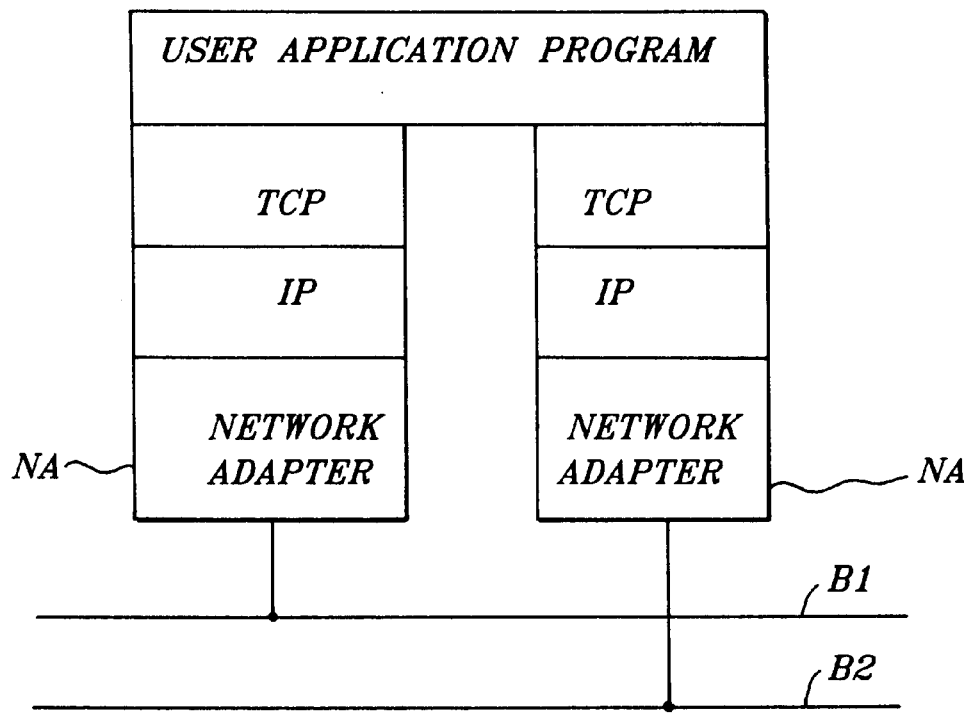
FIG. 3 is a schematic representation showing the conventional technologies.
Figure 3B:
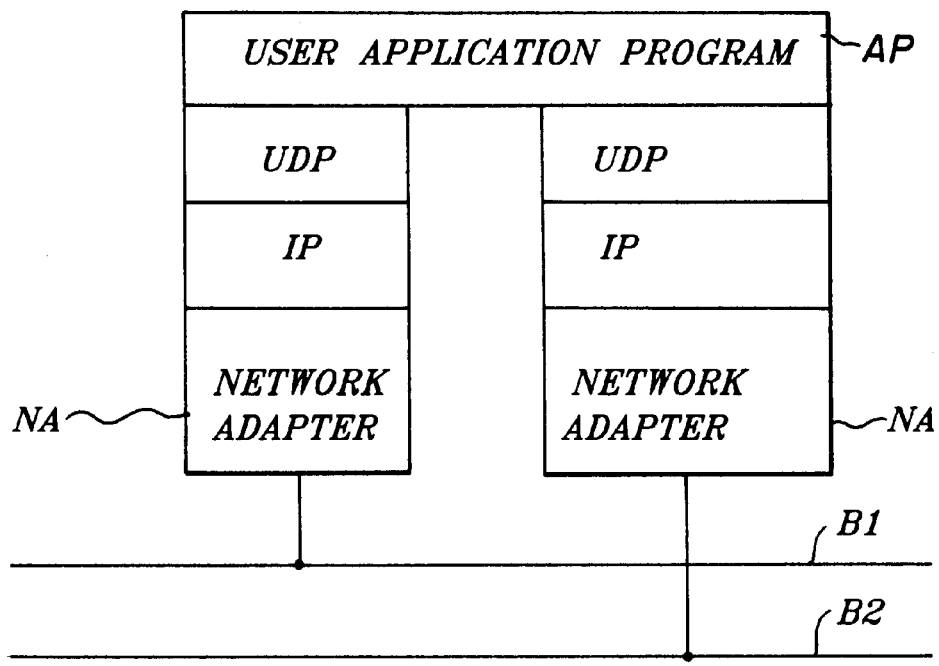
Figure 4:
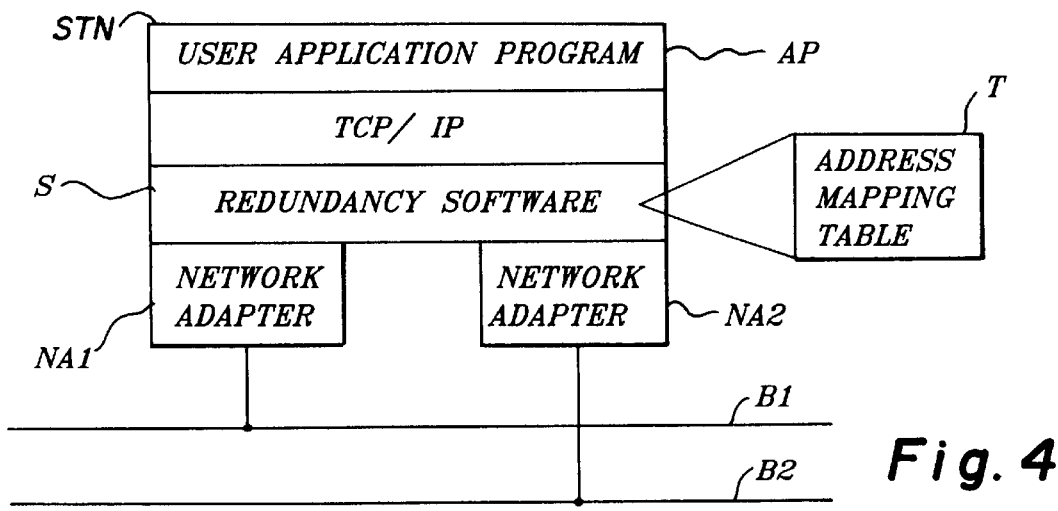
FIG. 4 is a conceptual diagram showing the configuration of one embodiment of the present invention.

FIG. 4 is a diagram showing the conceptual configuration of one embodiment of the present invention. In FIG. 4, the same components as those referred to in the figures mentioned earlier are given the same reference numbers.

Referring to FIG. 4, a communication station STN is connected to E buses B1 and B2.

In FIG. 4, the communication station STN has two network adapters NA1 and NA2 and one set of TCP/IP protocols. Redundancy software S is located between the network adapters and the protocol layers. The redundancy software S contains a MAC address mapping table T. Above the layers of TCP/IP protocols is a user application program AP that uses the functions of TCP/IP protocols.

Figure 5:
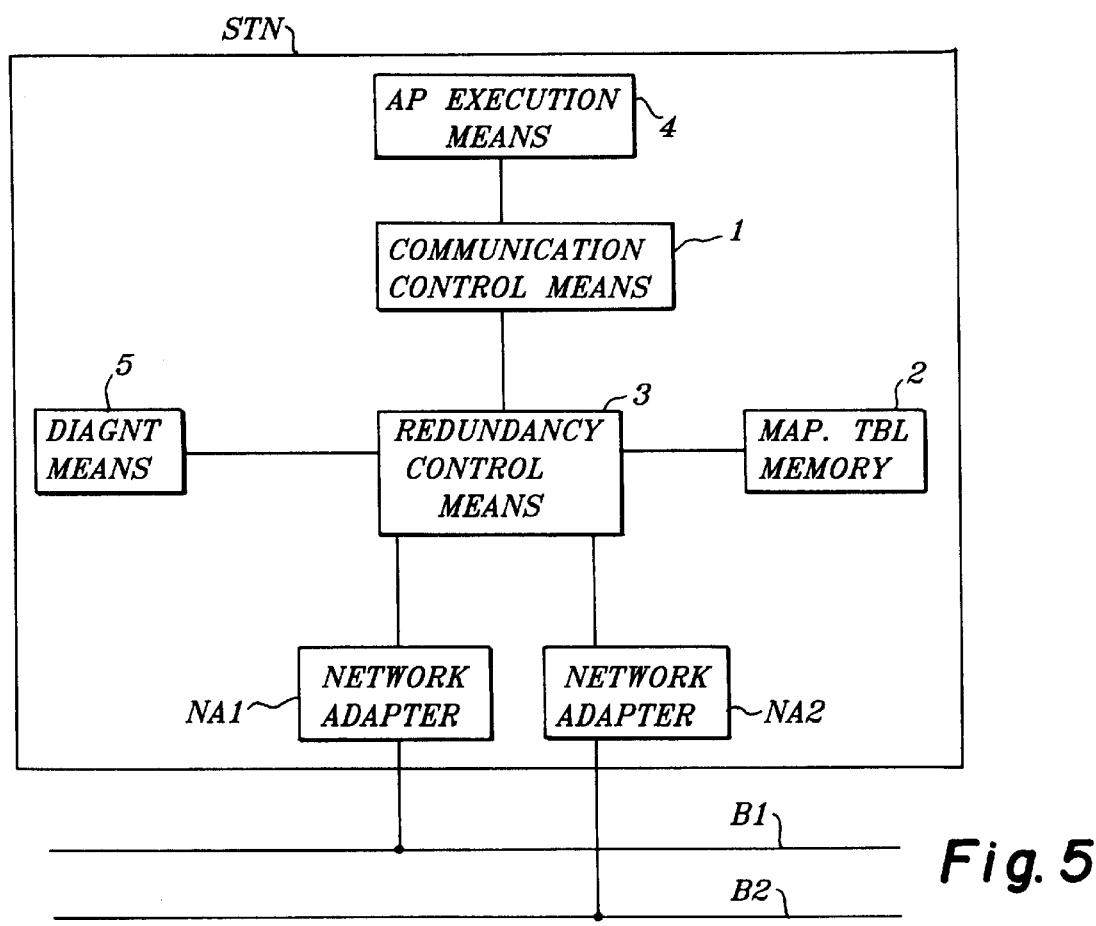
FIG. 5 is the detailed diagram of communication station of the present invention.

In FIG. 5, the symbol "STN" means "station". The bus is labeled "B1 and B2". In FIG. 6, the symbol "NA" means "network adapter".

FIG. 5 is a diagram showing one example of the embodiment of FIG. 4.

Network adapters NA1 and NA2 are redundantly incorporated in a communication station, each of which is provided with its own specific MAC address.

One unit of a communication control means 1 is incorporated in each communication station and communicates with other communication control means according to TCP/IP protocols.

A mapping table memory 2 contains an address mapping table. A redundancy control means 3 exists between the pair of network adapters NA1 and NA2 and the communication control means 1. If the redundancy control means receives a transmission request from the communication control means 1, it converts the receiver's MAC address included in the transmission request into the MAC address of a remote network adapter to communicate with. If the redundancy control means receives a frame from a network adapter, it converts the sender's MAC address included in the received frame into the MAC address that the communication control means 1 of the local communication station is aware of. The redundancy control means 3 executes the redundancy software S.

An AP execution means 4 uses the functions of TCP/IP protocols to execute the user application program AP.

A diagnostic means 5 examines whether communication is carried out correctly.

The behavior of this embodiment is explained as follows.

FIG. 6 shows a network where redundantly configured three communication stations A, B and C are incorporated. Each of the communication stations A, B and C has a pair of network adapters NA1 and NA2, where these network adapters have their own MAC addresses MA1, MA2, MB1, MB2, MC1 and MC2, respectively. These three communication stations are interconnected through the two redundant E buses B1 and B2, though the stations are independent of the bus configuration. The stations and redundancy mechanism of the presnet invention still function even if connected to a single E bus.

In FIGS. 7(a)–7(c) and 8(a) and 8(b), the following symbols have the following meanings. "MAC" means a "6-byte receiver address" commonly known as "MAC ADDRESS". "ADD" means "address". "MP TBL" or "MAPPING TABLE" means "mapping table". "MA1, MA2, MB1, MB2, MC1, and MC2" refer to the network adapters of FIG. 6. Also, in FIGS. 8(a) and 8(b) the symbol "VIR" means "virtual". "MAC-A, MAC-B, MAC-C" means "MAC of stations A,B,C". "STA.A, B,;C" refers to "station A,B,C". "COM.PT" means "communication partner of".

The MAC address mapping tables shown in FIG. 7 exist in the redundancy software of each of the three stations. According to this table, the communication partner of each network adapter is predetermined.

The communication control means 1, which communicates with other communication control means according to IP, is only aware of remote stations' MAC addresses having the suffix "1" (MA1, MB1 and MC1 in this example), i.e., route-1 MAC addresses. This arrangement can be materialized by 1) taking advantage of the rule that in cases where an Ethernet frame for locations an IP address is broadcast in order to determine the MAC address of a remote station to communicate with, the station having queried IP address returns a response (ARP: Address Resolution Protocol) with route-1 MAC address, and 2) handing over the loop-1 MAC address to IP when the requesting communication station receives the response. IP of the transmitting and receiving stations always use loop-1 MAC addresses.

Which of the network adapters is selected at a transmitting station and which of the network adapters' MAC addresses is sent by a receiving station to the IP in question depends on the following redundancy algorithms.

In the case of a first redundancy algorithm, a transmitting station always transmits a frame to one particular network adapter. When two stations communicate with each other, it does not matter if the regular-use network adapter differs between the two directions of transmission. Since the same communication frame will never be received twice, the redundancy software of a receiving station only converts MAC addresses, thus sending all received frames to the IP.

Redundancy software can use two network adapters alternately to select one to transmit through. The software avoids using a network adapter in a communication route where a failure is detected. This arrangement ensures the safe transfer of frames except for only one instance that immediately follows the failure.

A transmitting station can fix the choice of its regular-use network adapter between the two adapters. A switch is made to the stand-by network adapter only if a failure is detected in the route to which the regular-use network belongs.

Network adapters can be switched between to determine which is the regular-use one or stand-by one. This switching may be carried out at appropriate time intervals or each time a specific frequency of transmission is reached, rather than at every round of transmission.

An Ethernet frame can be exchanged with a remote station, at appropriate time intervals, in order to actively examine the cause of failure occurring in a communication route, thus using the frame to diagnose the route. This diagnosis may be carried out at both the regular-use and stand-by network adapters.

For the aforementioned diagnosis, ICMP echoes included in the standard Internet Protocol may be used. This method of diagnosis is based on the principle that as long as the communication route is normal, a remote station-returns an echo response when an echo request is sent to the station.

Diagnosis may be carried out on all the MAC addresses used in an Ethernet. This method of diagnosis covers every possible case of failure and, therefore, always ensures correct transfer.

A diagnostic frame may be sent only to the communication station that is necessary to secure a communication route. For example, a diagnostic frame may be sent only to a router or a switch having its own IP address, if there is any on the network, in order to secure a communication route up to that point. This strategy prevents diagnostic frames from being sent out to the network at random, thus relieving traffic congestion in the network.

In the case of a second redundancy algorithm, a communication station, when transmitting frames, sends a transmission request to both of the network adapters after changing the receiver's MAC.

If the station A has a transmission request to be sent to the station B, the IP of the station A builds and transfers an IP packet with the MAC address MB1 to the redundancy software S. This transfer takes place according to the following procedure.

(1) If route-1 is active, the redundancy software S sends this IP packet to NA1 adapter with destination MAC address MB1. Source MAC address MA1 is attached by NA1. (go to (3))

(2) If route-2 is active, the redundancy software S replaces the destination MAC address MB1 with route-2 MAC address MB2 and sends this IP packet to NA2 adapter. Source MAC address MA2 is attached by NA2. (go to (4))

(3) If NA1 of the station B receives the IP packet, the redundancy software S transfers this IP packet with the source MAC address MA1 to the IP, because IP knows MA1 is the MAC address of the station A.

(4) If NA2 of the station B receives the IP packet, the redundancy software S replaces its source MAC address MA2 with MA1 and transfers this IP packet to the IP, because IP knows MA1 is the MAC address of the station A.

As a result of the operation explained above, IP packet reaches station B from station A. Whenever the bus switch over takes place between route- 1 and route-2, above procedure switches between (1, 3) and (2, 4), while IP always uses route-1 MAC addresses.

More than one algorithms can be applied to select active route. It is possible for each stations use different redundancy algorithms.

Routing Algorithm 1

The sending station always transmits a frame through one regular-use route. It does not matter even if two mutually communicating stations use different routes, e.g. station A activates route-1 and station B activates route-2. This routing algorithm can be one of the following three algorithms.

Routing Algorithm 1.1

The sending station changes regular-use route alternatively, unless it detects a communication problem in one of the routes.

Routing Algorithm 1.2

The sending station changes regular-use route periodically, unless it detects a communication problem in one of the routes.

Routing Algorithm 1.3

The sending station continues to use one route as the regular-use route. Once a communication problem is detected in the route, switch over of regular-use route takes place.

Diagnosis Algorithm 1

Routing algorithm 1 can be accompanied with a diagnosis algorithm for the routes, including network adapters and media. A pair of communicating stations exchange diagnosis frames to determine the route is available or not. This diagnosis frame can be sent through either both or one of routes. One or more algorithms below can be accompanied with this algorithm.

Diagnosis Algorithm 1.1

The diagnosis frame is ECHO message of ICMP. One station sends ECHO request and receives ECHO response from the other-station if the route is operational.

Diagnosis Algorithm 1.2

A station sends diagnosis frame to all of MAC addresses on the network. All possible routes can be examined by this algorithm.

Diagnosis Algorithm 1.3

A station sends diagnosis frame only to MAC addresses which are necessary to secure the routes. It is not necessary to send diagnosis frame beyond switches or routers. This algorithm reduces number of diagnosis frame on the network.

Routing Algorithm 2

The sending station transmits frames through all network adapters after replacing destination MAC address with appropriate one for each route. The receiving station receives the same IP packet through network adapters and the redundancy software selects one to transfer to the receiving IP. This selection.algorithm can be one of the following three algorithms.

Routing Algorithm 2.1

The receiving station selects changes receiving route alternatively, unless it detects a communication problem in one of the routes. Received frames through other routes are used for diagnosis. If no frame is received through the selected route while other routes receive valid frames, the selected routes may be damaged and is not chosen.

Routing Algorithm 2.2

The receiving station selects changes receiving route periodically, unless it detects a communication problem in one of the routes. Received frames through other routes are used for diagnosis. If no frame is received through the selected route while other routes receive valid frames, the selected routes may be damaged and is not chosen.

Routing Algorithm 2.3

The receiving station selects the first frame from the routes. Received frames through other routes are used for diagnosis.

In addition to the aforementioned MAC addresses, virtual MAC addresses may be defined. The capability to use virtual MAC addresses is independent of the redundancy algorithms noted earlier and can coexist with the algorithms. The MAC address mapping table contains such virtual MAC addresses. Virtual MAC addresses refer to the MAC addresses of communication partners that IP uses. These MAC addresses neither need to have any correlation with the real MAC addresses of communication partners nor need to be made known to the communication partners.

FIG. 8 is one example of a MAC address mapping table that contains virtual MAC addresses.

The IP is informed of the virtual MAC addresses only. The virtual MAC addresses are made known to the IP by means of ARP explained earlier. If a transmission request is issued from a station A to a station B, the redundancy software of the station A is given an IP packet to be sent to the virtual address MAC-B. At this point, the virtual destination address is converted to MB1 if the IP packet is to be sent through a route-1 network adapter or converted to MB2 if the IP packet is to be sent through a route-2 network adapter, before the IP packet is sent out. In the station B, the sender's MAC address is changed to MAC-A, regardless of whether the address is MA1 or MA2, before the source address is informed of the IP.

As a result of this arrangement, MAC addresses that the IP uses are independent of hardware and, therefore, recovery from failures becomes easier. Suppose a case, for example, where the route-1 network adapter of the station A fails and needs to be replaced. Although the route-1 network adapter is out of service, communication still continues through route-2. If the route-1 network adapter is replaced, the new adapter will have a new different MAC address, MA3, for example. In the case of the address mapping table in FIG. 7, if MA1 in the MAC address mapping table of the station B is changed to MA3, the MAC address MA1 used by the IP will no longer exist in the table, causing such problems as a break in connection. Virtual MAC addresses enable the network adapter to be replaced without affecting the behavior of the IP since all that has to be done is to rewrite the specific MAC address of a remote communication partner MA1 to MA3 in table 8(b).

Figures 8A, 8B, 9:
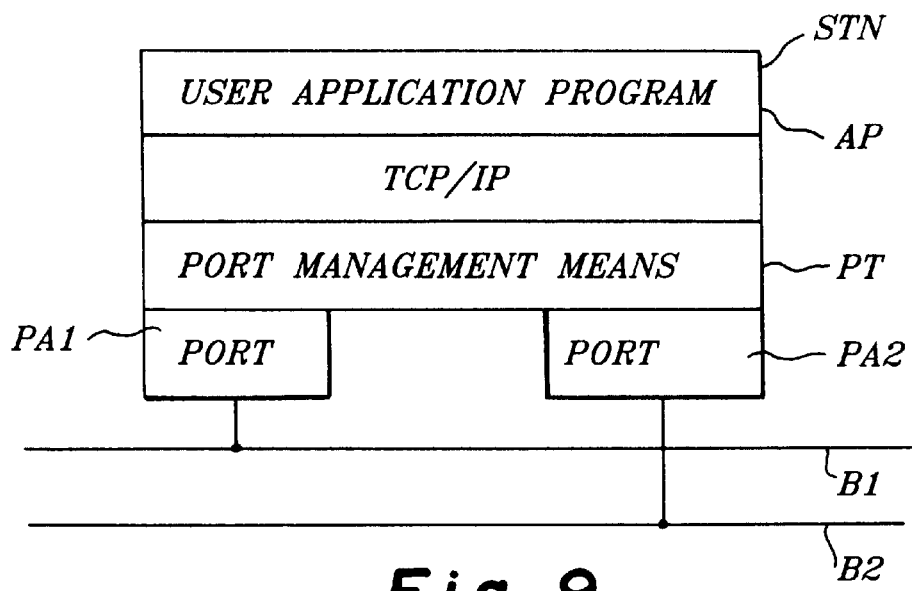
FIG. 9 is a conceptual diagram configuration of another embodiment of the present invention.

The table shown in FIG. 8(a) is that of the MAC address mapping table of Station A, and the table shown in FIG. 8(b) is that of the MAC address mapping table of Station B. The MAC can be changed as desired from the different network adapters 1,2, and 3, as just mentioned.

MAC addresses of network adapters that were used first may be selected as the virtual MAC addresses. For example, the table in FIG. 8(a) discussed above may be initialized so that "MAC-A=MA1 and MAC-C=MC1." This strategy saves labor involved in deciding virtual MAC addresses. If any real MAC address changes because of a failure, only its virtual MAC address has the original information.

A MAC address mapping table may be updated using MAC addresses received from each network adapter. Since addresses determined by ARP are always notified at the time of system startup, it is possible to generate a MAC address mapping table automatically. If some network adapters are replaced, frames can be received from the new adapters to incorporate the adapters into the mechanism of redundancy.

Figure 10:
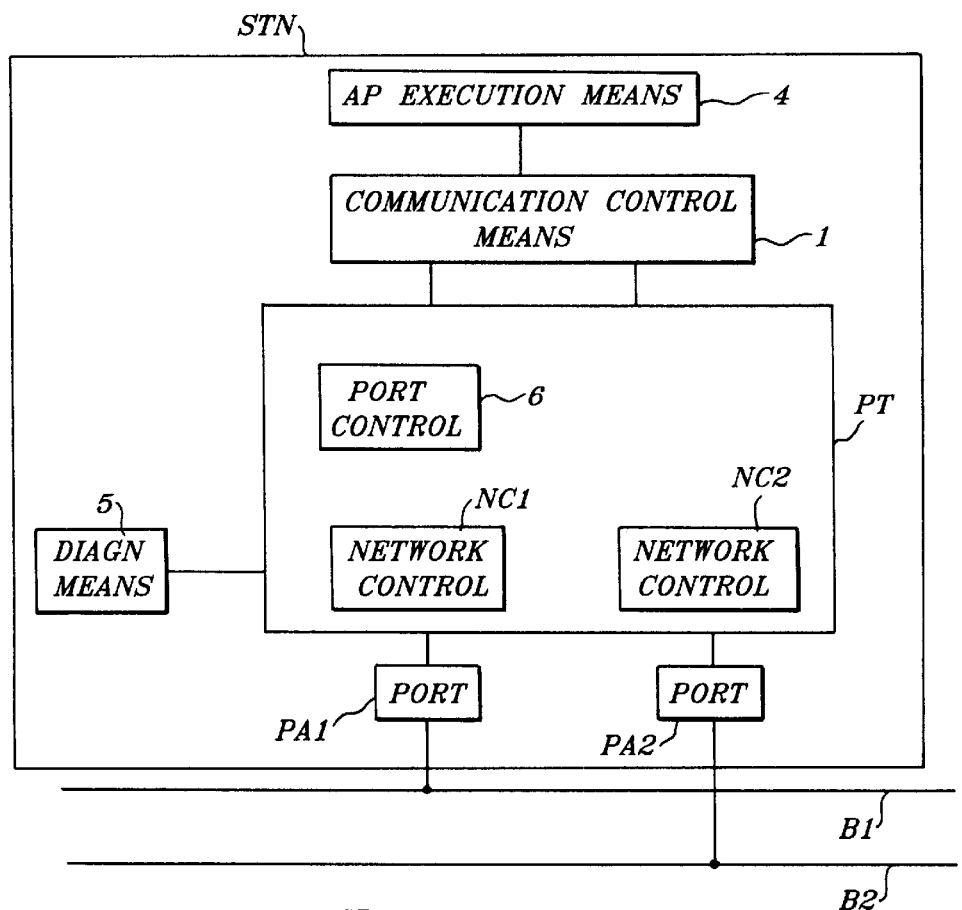
FIG. 10 is the detailed diagram of communication station of the present invention.
Figure 11:
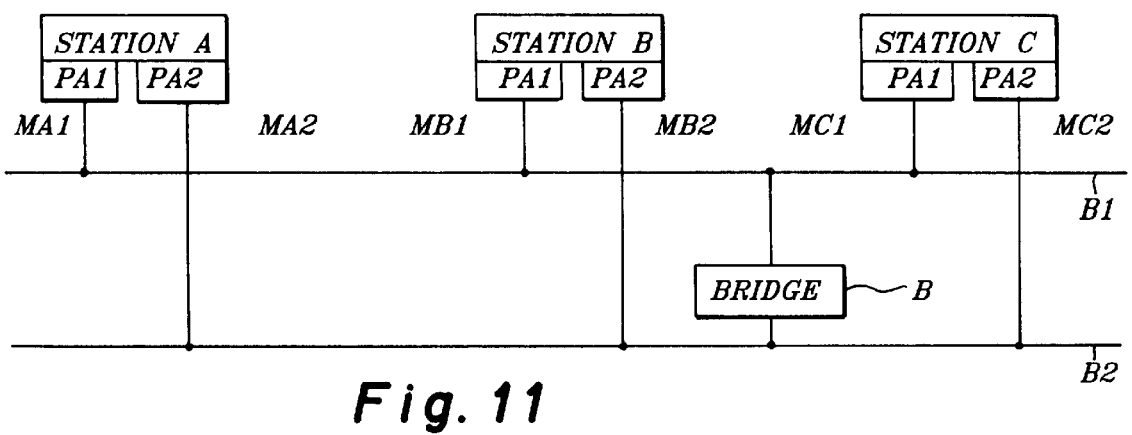
FIG. 11 is a diagram showing a E buses connected with a bridge.

In FIGS. 9, 10 and 11, the symbol "B1 and B2" refer to the bus. "STN" means "station". "DIAGN MEANS" means "diagnostic means or circuitry 5". "PT" means "port management means or circuitry" "AP execution means" refers to "Application Program execution means or circuitry 4".

FIG. 9 is the conceptual diagram of another embodiment of the present invention.

In FIG. 9, a station STN has two ports, PA1 and PA2, one set of TCP/IP protocols, and a port management means PT between the pair of the ports and the layers. For a most of existing a normal operating systems, the port management means PT can be installed as part of a device driver. A user application program AP that uses the functions of TCP/IP exists above the TCP/IP.

FIG. 10 is an example showing the configuration of the embodiment of FIG. 9.

Ports PA1 and PA2 only transfer or receive communication frames and have no MAC addresses. Network controllers NC1 and NC2 connected to the layer and the ports have MAC addresses.

If the regular-use port is changed, a port control means 6 connects the network controller having a MAC address that the communication control means 1 is aware of to the new regular-use port.

The behavior of this embodiment is explained as follows.

FIG. 11 shows a network where three dual-redundant communication stations are interconnected. Each of the three stations A, B and C has a pair of ports. The MAC addresses of network controllers connected to these ports are assumed to be MA1, MA2, MB1, MB2, MC1 and MC2, respectively, and the MAC addresses of regular-use ports are assumed to be those with suffix "1" (MA1, MB1 and MC1 in this example). The three stations can be connected to a single network, or network may be a separate ones connected through a bridge B as long as a communication route can be established between any two or more ports.

For example, assume that the stations A and B communicate with each other. Then, the regular-use port of both stations is PA1 and the MAC addresses of network controllers connected to the regular-use ports are MA1 and MB1. TCP connection is established using four parameters, i.e., the IP address and MAC address MA1 of the station A, the IP address and MAC address MB1 of the station B. Here, assume that a failure is detected in the regular-use port of the station A. Since a failure has been detected in the regular-use port of the station A, the port management means PT connects the network controller whose MAC address is MA1 to-the port PA2 to continue communication. At this point, neither the IP address nor the MAC address of the communication partner changes, however, when viewed from the station B, thus allowing communication to continue. The MAC address of the network controller connected to the port PA1 of the station A is MA2, in this example. Recovery from the failure is awaited by continuing diagnosis using that MAC address.

Elements that exist in a communication route between any given two stations A and B that communicate with each other through their regular-use ports are:
[1] a transmitter circuit in the station A
[2] network elements (such as cables) located between the regular-use ports of the two stations A and B
[3] a receiver circuit in the station B
[4] a transmitter circuit in the station B
[5] a receiver circuit in the station A
In this embodiment, the elements that can be the cause of switching between the ports of the station A are items [1], [2] and [5]. All other elements recover to normal when switching takes place in the station B.

Since in an E bus, communication between any given two or more stations takes place only when necessary, this type of switching alone is not enough for constant network monitoring. To solve this problem, an ICMP echo request is transmitted to another station to diagnose a network. If any echo response returns, the network between the transmitter/receiver circuits of the station A and the communication partner of the station A is judged to be normal.

There can be more than one failure-detecting algorithms, as described below.
(1) Item [1] or [5] is judged to be faulty if no frames are received for a specific time interval longer than the diagnosis period.
(2) There may be a problem with one or more of items [2] to [4] at a station from which no echo response for diagnostic purposes returns at all. Item [2] is likely to be the cause of failure if the network fails to recover after a specific time length. In that case, the port is changed at the local station.

The same diagnosis is required for the stand-by ports also, though the diagnosis period may be longer than that of the regular-use ports.

A diagnostic frame may be sent to only the equipment that is necessary to secure a communication route. For example, a diagnostic frame may be sent only to a router or a switch having its own IP address, if there is any in the network, in order to secure a communication route up to that point. Needless to say, diagnosis may be carried out for all remote stations.

For cases where a network comprises any bridge or switch that works according to a receiver's MAC address, the routing table in a bridge or a switch must also be changed if the port in use is changed. This address change can be achieved by sending echoes to other stations immediately after a switch between ports to forcibly change the address to which the bridge or switch sends frames.

Figure 12:
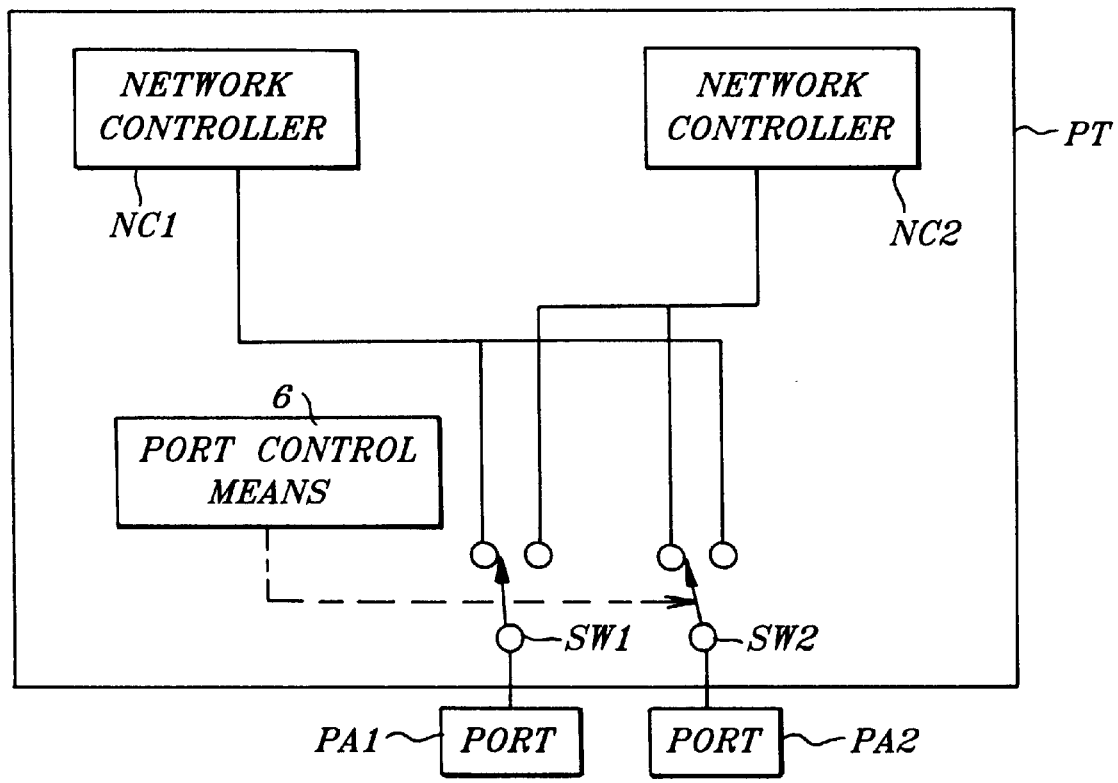
FIG. 12 is a detailed diagram showing the configuration port management means of another embodiment of the present invention.
Figure 13:
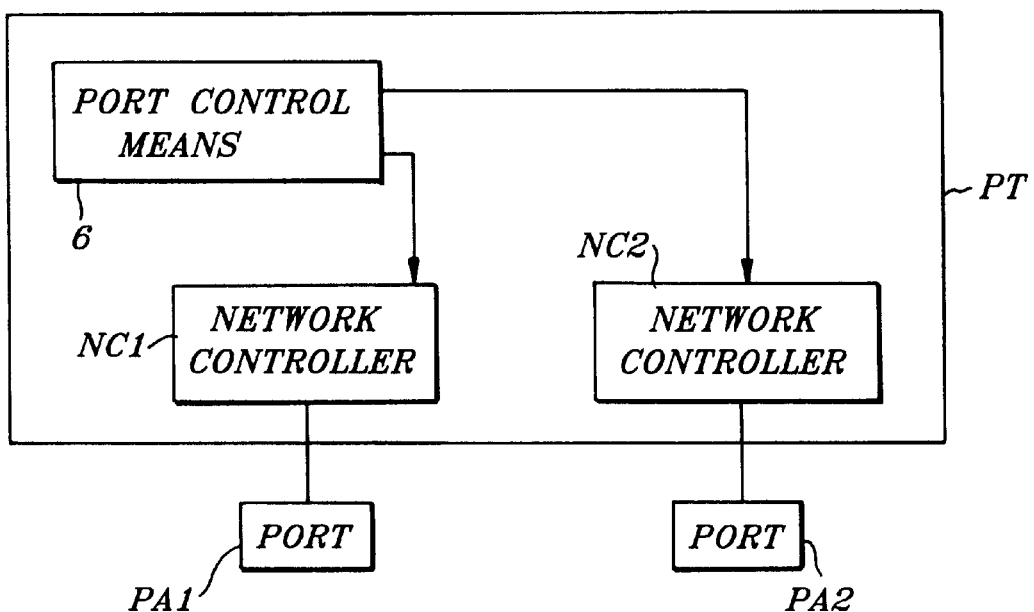
FIG. 13 is a diagram showing the configuration of a port management means of one embodiment of the present invention.

FIGS. 12 and 13 are examples showing the configuration of the port management means PT.

In FIG. 12, a MAC address is given to each of network controllers NC1 and NC2, and ports PA1 and PA2 can be swapped by switches SW1 and SW2. Switches SW1 and SW2 are controlled by the port control means 6. In this configuration example, port swapping takes place in a very short time. The network controllers NC1 and NC2 are designed to transfer communication frames between a communication control means 1 and an E bus B1 or B2.

In FIG. 13, network controllers NC1 and NC2 and ports PA1 and PA2 are combined in a one-to-one relationship. The MAC address is changed by allowing the port control means 6 to set MAC address to each of the network controllers NC1 and NC2. In this example of configuration, a relatively long period of time is required to swap the MAC addresses. This configuration can cope with problems, however, arising when the regular-use controller fails.

It is possible to embody both of the examples shown in FIGS. 12 and 13 at the same time.

As described above, the advantages offered by the present invention are as follows.

The advantages offered by the present invention as described in claims 1 to 5, claim 10 and claims 15 to 18 are as follows:
[1] There is no need to use special hardware. Commercially available network adapters can be directly used with such equipment as personal computers.
[2] Even non-redundant stations can coexist (as those on the regular-use side) in this communication control system, allowing the total system cost to be kept low.
[3] No special functions are required for the levels of layers higher than the IP layer, imposing no extra load on the user application program.
[4] Since the user application program needs not to be aware of the redundancy, other existing application programs can also benefit from the advantages of redundancy without having to be modified.
[5] Since TCP connection is non-redundant, the'system does not require any large memory. For a table of MAC address management to be able to serve its purposes, several tens of bytes, for example, will suffice per remote station.
[6] TCP connection is maintained even if the communication route is changed. Effects of failure therefore do not affect the user application program.
[7] There is no increase in network traffic load. In redundancy algorithms, cables are basically independent of the communication control system.
[8] The communication control system can coexist with conventional redundant networks.

The advantages offered by the present invention as described in claims 6 to 9 and claims 11 to 14 are as follows:
[1] Elements in a network can be diagnosed.on an online basis and, therefore, there is in principle no risk to loose data by communication failure.
[2] It is possible to recover from communication failure automating.

The advantages offered by the present invention as described in claims 19 to 22, in addition to the advantages available from the present invention as described in claims 1 to 18, are as follows:
[1] A switch can be made smoothly from a faulty port (or communication route) to the other port (or communication route).

What is claimed is:

1. A communication control system comprising:
a plurality of network adapters;
a network;
a plurality of communication stations, each comprising a communication control means, and connected to said network through said plurality of network adapters;
wherein said plurality of communication control means communicate with each other according to TCP/IP protocols, and wherein a specific MAC address is assigned to each of said plurality of network adapters, with said plurality of communication control means being aware of only one MAC address for any single remote communication station;
said communication control system having a configuration in which only one of said plurality of communication control means is incorporated in each of said plurality of communication stations and said plurality of network adapters are incorporated redundantly in each of said plurality of communication station so that redundant paths are provided through said network between said plurality of communication stations; and furthermore comprising:
redundancy control means, disposed between said plurality of network adapters and said plurality of communication control means,
for converting a receiver MAC address, included in a transmission request, into an MAC address of a network adapter for communication, when said redundancy control means receives a transmission request from said communication control means, and
for converting a sender MAC address, included in a received frame, into an MAC address which said communication control means of a local communication station is aware, when said redundancy control means receives a frame from a network adapter.

2. The system of claim 1, wherein said redundancy control means has an address mapping table, and wherein network adapters serving as communication partners of local network adapters are defined therein.

3. The system of claim 2, wherein MAC addresses of two local network adapters and network adapters serving as communication partners of local network adapters are written in pairs in said address mapping table.

4. The system of claim 1, wherein said redundancy control means selects either of two redundant network adapters as regular use network adapter to carry out communication.

5. The system of claim 4, wherein said redundancy control means selects said regular use network adapter alternately from said two redundant network adapters to carry out communication.

6. The system of claim 4, further comprising diagnostic means for causing said regular use network adapter to send out network diagnostic frames for a specified period.

7. The system of claim 6, wherein said diagnostic means sends ICMP echo messages for a given period as network diagnostic frames and judges failure when said diagnostic means fails to receive an echo response for a length of time longer than a specified time interval.

8. The system of claim 6, wherein said diagnostic means sends diagnostic frames to all communication stations.

9. The system of claim 6, wherein said diagnostic means sends diagnostic frames only to a communication station that is necessary to secure a communication route.

10. The system of claim 2, wherein said redundancy control means of a transmitting communication station sends out communication frames to all network adapters; and wherein said redundancy control means of a receiving communication station selects only a communication frame or communication frames having an MAC address which said communication control means of a local communication station is aware of, among a plurality of communication frames received by a local redundant network adapter, and then passes said communication frame or communication frames to said communication control means.

11. The system of claim 10, wherein said redundancy control means of said receiving communication station passes said communication frame or communication frames received by a regular use network adapter to a local communication control means and uses said communication frame or communication frames received by another network adapter as diagnostic frames.

12. The system of claim 10, wherein said redundancy control means of said receiving communication station selects a regular use network adapter between two redundant network adapters.

13. The system of claim 11, wherein said redundancy control means of said receiving communication station designates a network adapter that receives communication frames as a new regular use adapter and a previous regular use network adapter as a standby network adapter.

14. The system of claim 11, wherein said redundancy control means of said receiving communication station passes said communication frames sent by a network adapter, which was first to receive communication frames, to a local communication control means and uses said communication frames that said redundancy control means receives from said other network adapter as diagnostic frames.

15. The system of claim 1, wherein said communication control means defines virtual MAC addresses and said redundancy control means carries out conversion between real MAC addresses and said virtual MAC addresses.

16. The system of claim 15, wherein real MAC addresses of a remote communication station that are defined during system startup are used as said virtual MAC addresses.

17. The system of claim 1, wherein said redundancy control means updates an address mapping table as result of successful receipt of communication frames.

18. A communication control system, wherein communication stations are connected to a network; the communication stations being provided with communication control means; the communication control means communicating with each other according to TCP/IP protocols and being aware of only one MAC address for any single remote communication station, said communication control station having a configuration in which only one unit of said communication control means is incorporated in each communication station, and comprising:
ports redundantly incorporated in each communication station so that redundant paths are provided through said network between said communication stations;
network controllers provided between said ports and said communication control means and having MAC addresses and operable to send or receive communication frames to or from said ports; and
port control means for connecting a network controller having an MAC address of which said communication control means is aware of to a new regular use port when a regular use port is changed.

19. The system of claim 18, wherein said port control means controls two redundant ports so that a regular use port carries out regular communication and another port carries out network diagnosis only.

20. The system of claim 18, further comprising a diagnostic means for transmitting network diagnostic frames through a port for a given period of time.

21. The system of claim 20, wherein said diagnostic means sends ICMP echo messages for a given period of time as diagnostic frames and judges failure when said diagnostic means fails to receive a response for a period of time longer than a specified time interval.

22. The system of claim 20, wherein said period of time for which said diagnostic means sends diagnostic frames differs between a regular use port and another port.

* * * * *